(12) United States Patent
Boisset

(10) Patent No.: US 11,207,931 B2
(45) Date of Patent: Dec. 28, 2021

(54) METHOD FOR PAIRING A MEASUREMENT MODULE WITH ITS ASSOCIATED WHEEL WITH FILTERING OF THE ANGULAR POSITION

(71) Applicants: Continental Automotive France, Toulouse (FR); Continental Automotive GmbH, Hannover (DE)

(72) Inventor: Jean-Philippe Boisset, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/058,755

(22) PCT Filed: May 27, 2019

(86) PCT No.: PCT/FR2019/051227
§ 371 (c)(1),
(2) Date: Nov. 25, 2020

(87) PCT Pub. No.: WO2019/229349
PCT Pub. Date: Dec. 5, 2019

(65) Prior Publication Data
US 2021/0206212 A1 Jul. 8, 2021

(30) Foreign Application Priority Data
May 31, 2018 (FR) ........................................ 1854692

(51) Int. Cl.
*B60C 23/04* (2006.01)
*G01P 3/48* (2006.01)
*G01P 15/00* (2006.01)

(52) U.S. Cl.
CPC ............ *B60C 23/0489* (2013.01); *G01P 3/48* (2013.01); *G01P 15/00* (2013.01)

(58) Field of Classification Search
CPC ......... B60C 23/0489; G01P 3/48; G01P 15/00
See application file for complete search history.

(56) References Cited

U.S. PATENT DOCUMENTS

| 2011/0071737 A1* | 3/2011 | Greer | B60C 23/0416 |
| | | | 701/49 |
| 2011/0313623 A1* | 12/2011 | Greer | B60C 23/0489 |
| | | | 701/49 |

(Continued)

FOREIGN PATENT DOCUMENTS

WO 2011006819 A2 1/2011

OTHER PUBLICATIONS

International Search Report and Written Opinion for International Application No. PCT/FR2019/051227, dated Oct. 8, 2019, 9 pages.

(Continued)

*Primary Examiner* — Manuel A Rivera Vargas
(74) *Attorney, Agent, or Firm* — RatnerPrestia

(57) ABSTRACT

A method for pairing a measurement module with a wheel of a motor vehicle. The wheel revolution frequency value and the total number of acquisitions are sent with the emission angle value to the computer that stored a current angular position for at least one wheel and a series of angular positions. The computer selects angular positions sampled from a series of angular positions up to a total number of acquisitions, then filters the wheel revolution frequency, which filtering is similar to the filtering performed in the measurement module in order to obtain a sampled and filtered angular position and is then compared with the angular position with, for a difference of less than an experimentally predetermined percentage, a validation of the phase shift between the emission angles of the signals of the measurement module and the angular positions.

10 Claims, 3 Drawing Sheets

(56) References Cited

U.S. PATENT DOCUMENTS

| | | |
|---|---|---|
| 2012/0116607 A1 | 5/2012 | Guinart |
| 2013/0218364 A1 | 8/2013 | Juzswik |
| 2016/0129735 A1 | 5/2016 | Bettecken et al. |
| 2017/0106706 A1 | 4/2017 | Bettecken et al. |

OTHER PUBLICATIONS

International Search Report and Written Opinion for International Application No. PCT/FR2019/051227, dated Oct. 8, 2019, 14 pages (French).

English Translation of the Written Opinion for International Application No. PCT/FR2019/051227, dated Oct. 8, 2019, 6 pages.

* cited by examiner

METHOD FOR PAIRING A MEASUREMENT MODULE WITH ITS ASSOCIATED WHEEL WITH FILTERING OF THE ANGULAR POSITION

CROSS REFERENCE TO RELATED APPLICATIONS

This application is the U.S. National Phase Application of PCT International Application No. PCT/FR2019/051227, filed May 27, 2019, which claims priority to French Patent Application No. 1854692, filed May 31, 2018, the contents of such applications being incorporated by reference herein.

FIELD OF THE INVENTION

The present invention relates to the field of motor vehicles and more specifically relates to a method and to an assembly of a computer and of measurement modules for pairing each measurement module with the wheel in which it is mounted, which pairing is performed after verifying whether a filtering operation performed in a measurement module has not distorted the determination of emission angles sent by each wheel module to the computer.

The invention particularly aims to propose a fast, reliable and effective method allowing a computer placed on board a motor vehicle to associate a measurement module with the wheel in which it is mounted.

BACKGROUND OF THE INVENTION

Nowadays, it is known practice for a measurement module to be mounted in each wheel of a motor vehicle for monitoring certain parameters of said wheel. Such a measurement module is commonly called a "TPMS module", for "Tire Pressure Monitoring System". Such a measurement module, the data of which are transmitted to a computer placed on board the vehicle, allows, for example, the pressure and the temperature of the tire to be measured.

As a motor vehicle comprises a plurality of wheels, the computer needs to identify the measurement module of each wheel in order to allow it to determine the wheel with which the data corresponds and thus to be able to utilize said data. Each measurement module therefore needs to locate the wheel in which it is mounted. Such a location and association method is known to a person skilled in the art as pairing. US 2017/106706 relates to a method and an arrangement for locating the installation position of at least two wheels on a vehicle.

In one existing solution, known as "Localization with Synchronized Emissions" (LSE), it is known practice for a measurement module to be used for each wheel that comprises an acceleration measurement sensor, with this measurement module commonly being called the wheel unit.

When the wheels turn, the measurements performed by the acceleration measurement sensor allow the measurement module to determine the time at which it is in a predetermined position, for example, at its maximum height, for which it then sends the computer a coded message in one or more signals.

In order to associate each measurement module with a wheel of the vehicle, the signals received from each measurement module need to be associated with a parameter specific to each wheel. However, when the vehicle is moving, each wheel is seen to turn at a rotation speed that differs from the other wheels, particularly due to the fact that some of the wheels can have different diameters and that they follow different trajectories on bends.

In this existing solution, the computer uses the wheel anti-lock braking system of the vehicle, also known as ABS system, to determine the angular orientation of each wheel.

The ABS system comprises a plurality of wheel anti-lock braking modules each mounted facing each wheel of the vehicle. Each wheel anti-lock braking module comprises a sensor, called WSS ("Wheel Speed Sensor"), supplying the computer with a signal representing the angular orientation of the corresponding wheel, with the computer advantageously forming part of an electronic control unit responsible for controlling and monitoring the measurement modules or wheel units.

For each measurement module, the computer thus correlates, upon each wheel revolution, the time of reception of the signal emitted by the measurement module with the value of the wheel angular orientation signal received from each anti-lock braking module.

In doing so, the computer determines that a measurement module is associated with a wheel when the angular orientation of said wheel is substantially the same each time a signal is emitted by this measurement module, i.e. each time the measurement module is found in the same angular position. A substantially constant phase shift then exists between the angular position and the emission angle of the measurement module.

Indeed, with the wheels turning at different speeds, particularly on bends, the result is that the signals emitted by a measurement module mounted in a given wheel are not synchronized with the angular orientations of the other wheels.

By proceeding in this way, the computer is then able to associate each measurement module with one of the wheels of the vehicle. In order to detect the emission angle, the measurement module samples acceleration measurements of the wheel adapted to the rotation speed, for example, but by no means being limited to, sampling 16 or 32 acquisitions per wheel revolution. A sampling duration is determined by measuring the rotation speed, which can be marred by errors or can change over the measurement window of the signal. This can have a significant impact with respect to the detection of the desired emission angle.

SUMMARY OF THE INVENTION

The problem underlying an aspect of the present invention is to compensate, for a measurement module associated with a wheel of a motor vehicle, for an error in detecting the desired angle due to filtering of the wheel revolution frequency that is no longer adapted to the current wheel revolution frequency.

To this end, an aspect of the present invention relates to a method for pairing a measurement module with a wheel of a motor vehicle comprising a plurality of wheels, the method being implemented by a computer placed on board the vehicle, the measurement module being mounted in one of the wheels and comprising an accelerometer or a shock sensor allowing an emission angle to be determined of successive measurement signals intended for the computer, which at the same time and periodically receives orientation signals representing an angular position of each wheel and which compares a phase shift between the emission angles of the measurement signals received from the measurement module and the respective angular positions for each wheel, the computer computing, for each wheel, the pairing of the measurement module with the wheel for which the angular positions exhibit a constant phase shift with the emission angles of a plurality of measurement signals received from the same measurement module, the measurement module, in order to determine the emission angle, performing the following:

firstly, sampling a number N of acquisitions of radial accelerations as a function of the time per wheel revolution, the sampling being repeated for a number x of consecutive wheel revolutions in order to provide a total number of acquisitions n;

secondly, filtering the wheel revolution frequency in order to extract a gravitational component of a radial acceleration on the total number of acquisitions n; and thirdly, computing a current emission angle value from the extracted gravitational component.

The method is characterized in that the wheel revolution frequency value and the total number of acquisitions n are sent to the computer in the measurement signal, in addition to the current emission angle value, with the computer having stored a reception time and a current angular position for at least one wheel by having also previously stored a series of angular positions for said at least one wheel and the computer selects, from the series of stored angular positions, the angular positions sampled at the same period equal to the inverse of the wheel revolution frequency, multiplied by the number of acquisitions of radial accelerations as a function of the time per wheel revolution, the selected angular positions being filtered by a filter, the cut-off frequency of which is the rotation frequency of the wheel, similar to the filtering performed in the measurement module and being implemented in order to obtain a curve of sampled and filtered angular positions, from which a sampled and filtered angular position is derived that is obtained after n samples, and compared with the current angular position, and, when the sampled and filtered angular position associated with said at least one wheel only differs by less than an experimentally predetermined percentage of the current angular position, the comparison of a phase shift between the emission angles of the measurement signals received from the measurement module and the respective angular positions for said at least one wheel is validated.

An aspect of the present invention is based on the observation that filtering for extracting a gravitational component of a radial acceleration can distort this extraction since the filter is no longer adapted to the initial frequency, for example, when the wheel revolution frequency changes.

This allows a wheel to be paired with a measurement module, by comparing angular positions of the wheel and emission angles of the measurement module and acknowledging a constant phase shift with the emission angles of a plurality of measurement signals received from the same measurement module and the angular positions of the wheel. If the angles received and computed according to the method always correspond to +/−x %, then it means that the measurement module is correctly paired with an angular position sensor.

It is possible to verify that a filtering operation performed in the computer, which filtering is similar to the filtering performed in the measurement module and involves filtering the angular positions sampled at the same period equal to the inverse of the wheel revolution frequency multiplied by the number of acquisitions of radial accelerations as a function of the time per wheel revolution and which has provided a specific sampled and filtered angular position for a total number of acquisitions, has not distorted this specific sampled and filtered angular position, which remains substantially close to the detected angular position. This prior verification is used to determine whether the filtering of the emission angle of the measurement module has not distorted this measurement and therefore whether the ensuing pairing can be performed reliably.

In a by no means limiting manner, the experimentally determined percentage can be 1%.

For the measurement module, the algorithm for processing the acceleration signal is not changed. However, the algorithm for processing angular positions in the computer is modified to keep a reserve of various angular positions. For example, if 256 values of angles can be stored per wheel revolution, then an angle value is provided for every 1.4°. Angular positions sampled at the same period equal to the inverse of the wheel revolution frequency multiplied by the number of acquisitions of radial accelerations and, finally, a specific sampled and filtered angular position for a total number of acquisitions to be compared with the current angular position are taken from the stored angular positions. The emission angle detection error due to filtering that is not adapted to the wheel revolution frequency caused by a wheel revolution frequency that has varied is naturally compensated.

Advantageously, the method is implemented for each wheel.

This mainly applies when there is no prior pairing. Indeed, after verifying the validity of the filtering, first pairing operations can be confidently implemented in terms of the validity of the emission angles of each measurement module, which makes the pairing more reliable.

Advantageously, the method is implemented for the wheel paired with said measurement module, for which wheel the angular positions exhibit a constant phase shift with the emission angles of a plurality of measurement signals received from said measurement module.

This applies in the event that a pairing operation has already been implemented by pairing at least one wheel with a measurement module. This allows this pairing to be verified afterward or allows the conventional pairing method to be replaced.

Advantageously, the wheel revolution frequency is computed using the following equation:

$$Fe = \frac{1}{2\pi} \times \sqrt{\frac{Z}{R}}$$

with Z being the radial acceleration and R being the radius of the wheel.

Advantageously, the radial acceleration Z is obtained as per the following equation:

$$Z = R \cdot \omega^2 + g \cdot \sin(\omega \cdot (t-t_0) + \varphi) + \gamma \cdot \cos(\omega \cdot (t-t_0) + \varphi),$$

with g being the gravity, t being the time, ω being the rotation speed of the wheel, t0 being the initial time, γ being a tangential acceleration component and φ being a phase shift, the product $R \cdot \omega^2$ being the centrifugal component, $g \cdot \sin(\omega \cdot (t-t_0)+\varphi)$ being the gravitational component, $\gamma \cdot \cos(\omega \cdot (t-t_0)+\varphi)$ being the longitudinal acceleration component, the gravitational component being extracted from the signal when filtering the wheel revolution frequency.

The aim of filtering is to eliminate the centrifugal component so as to only keep the gravitational component of a radial acceleration on the total number of acquisitions n, in other words to extract the gravitational component from the preceding equation.

Advantageously, the computer selects, from the stored angular positions, the angular positions sampled at the same period with a current number of acquisitions k and continues the selection until the current number of acquisitions k reaches the total number of acquisitions.

It is necessary to wait for a total number of acquisitions to be obtained in order to have a specific sampled and filtered angular position so that it can be compared with the current angular position, in order to verify whether or not the filtering was compliant and whether or not the sampled and filtered angular position differs by more than the predetermined percentage of the current angular position.

Advantageously, the computation of a sampled angular position ω* sampled at a time t is performed as per a Dirac comb with teeth sampled over a period Ts, with each tooth equaling the entire current mass of the sampled angular position ω*, the period Ts being equal to 1/(Fe·N), with Fe being the wheel revolution frequency and N being the number of acquisitions per wheel revolution, ω(kTs) being the angular position at the current number of acquisitions k, δ being the symbol of a Dirac, as per the following equation:

$$\omega^*(t) = \Sigma_{k=0}^{n} \omega(kTs) \delta(t-kTs)$$

Using a Dirac representation of the curve of sampled angular positions as a function of the time is a simplified representation of the curve illustrated as per the bars, the free end of which follows the profile of the curve.

Advantageously, when the number of current acquisitions k does not reach the total number of acquisitions n, the computation of the sampled and filtered angular position is continued on a larger number of current acquisitions until the total number of acquisitions is reached.

An aspect of the invention relates to an assembly comprising a computer and measurement modules each respectively associated with a wheel of a motor vehicle for implementing such a method, each measurement module having means for emitting and receiving measurement signals received or emitted by the computer, the computer having, on the one hand, means for receiving signals emitted by each measurement module and, on the other hand, means for receiving orientation signals representing the angular orientation of each wheel, each measurement module having means for filtering the wheel revolution frequency, characterized in that the computer comprises means for storing a reception time Tr, a current angular position ωr and a series of angular positions for at least one wheel, means for selecting angular positions sampled at the same period in the series of angular positions, filtering means, similar to the filtering means of the measurement module, for filtering the wheel revolution frequency component in the sampled angular positions in order to obtain a sampled and filtered angular position and means for comparing the current angular position with the sampled and filtered angular position in order to validate the comparison of a phase shift between measurement signals received from the measurement module and respective angular positions for said at least one wheel.

An aspect of the invention relates to a motor vehicle comprising a computer, a plurality of wheels, with each wheel comprising a measurement module and a plurality of wheel anti-lock braking modules mounted facing a wheel comprising means for emitting orientation signals to the computer that represent the angular orientation of said wheel, characterized in that the computer and the measurement modules form such an assembly.

BRIEF DESCRIPTION OF THE DRAWINGS

Further features, aims and advantages of aspects of the present invention will become apparent upon reading the following detailed description, and with reference to the appended drawings, which are provided by way of non-limiting examples and in which.

DETAILED DESCRIPTION OF THE PREFERRED EMBODIMENTS

Figure 1:
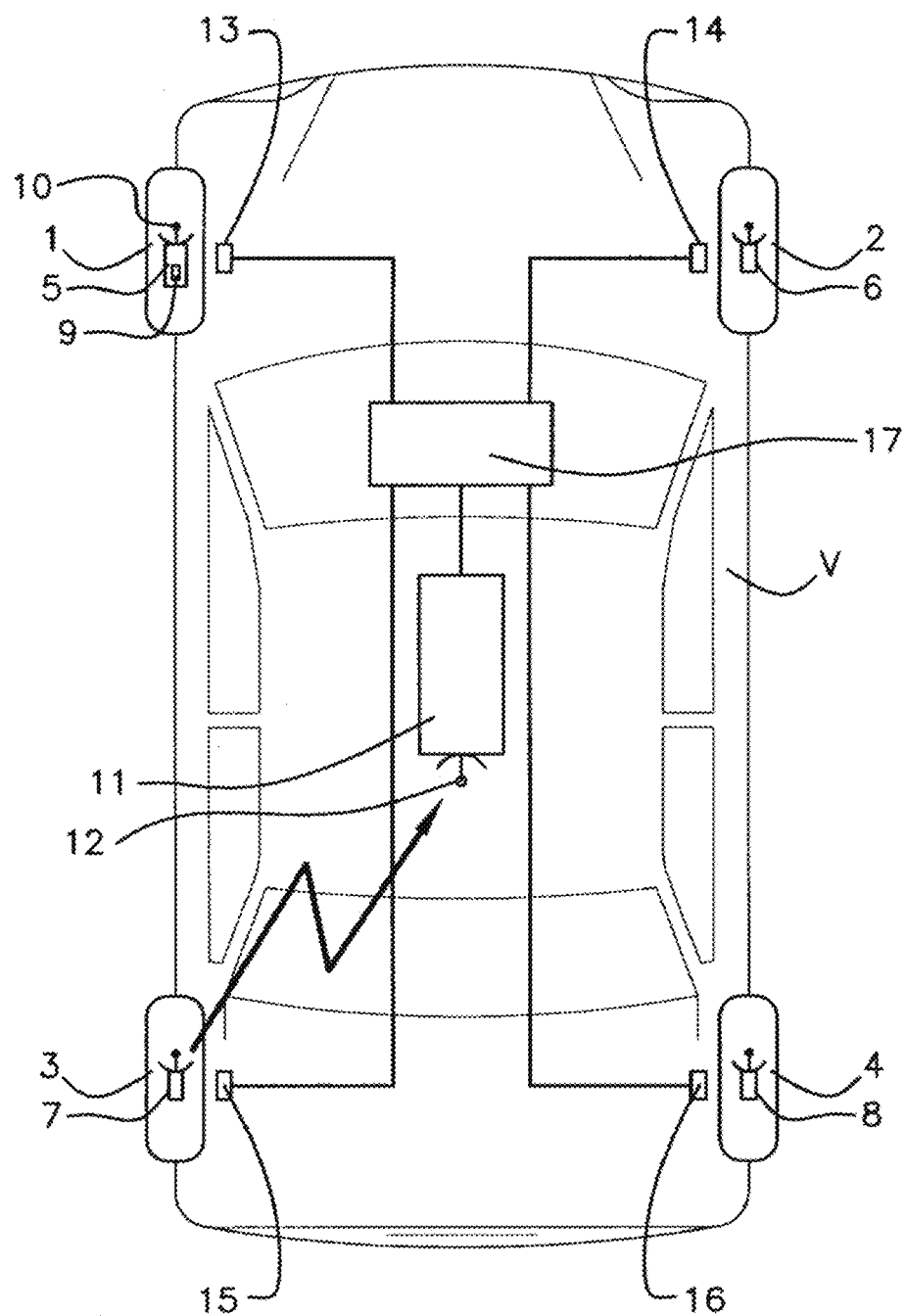
FIG. 1 is a schematic top view of a vehicle equipped with a monitoring system and an active safety system allowing implementation of the method according to an aspect of the invention.

FIG. 1 shows a vehicle V fitted with four wheels 1 to 4 and equipped with a system for monitoring parameters, such as the pressure or the temperature, of the tires comprising wheel units 5 to 8 as measurement modules. Frequently, the vehicle V is equipped with an active safety system such as an "ABS" wheel anti-lock braking system 13 to 16, 17, or an "ESP" dynamic stability control system.

Whilst FIG. 1 shows a motor vehicle with four wheels 1 to 4, it should also be borne in mind that an aspect of the present invention can be applied to a motor vehicle V with more than four wheels 1 to 4, such as a truck, for example.

Normally, the monitoring system conventionally comprises, first and foremost, a measurement module 5 to 8 associated with each wheel 1 to 4, which module is, for example, secured to the rim of said wheel 1 to 4 so as to be positioned inside the casing of the tire.

Each one of these measurement modules 5 to 8 integrates sensors dedicated to measuring parameters of the tires, connected to a microprocessor-based computation unit linked to an emitter 10, only one of which is referenced in FIG. 1.

Each of these electronic measurement modules 5 to 8 also conventionally integrates means 9 for measuring the angular position of the corresponding measurement module 5 to 8, for which only one measurement means is referenced in FIG. 1.

Such measurement means advantageously can be made up of an accelerometer capable of supplying modulated signals representing gravity values, and therefore the angular position of the electronic casing of the measurement module 5 to 8, the frequency of which, equal to the rotation frequency of the wheels 1 to 4, also allows the rotation speed of said wheels 1 to 4 to be computed.

The monitoring system also comprises a central unit 11 located inside the vehicle V, comprising a computer in the form of a microprocessor and integrating a receiver 12 capable of receiving the signals emitted by the emitters 10 of each of the four measurement modules 5 to 8. The central unit 11 can be used as a control unit and/or a remote control, but this is not the only embodiment of a control unit, the control unit comprising the computer can be a mobile telephone, a tablet, a computer or a similar electronic appliance.

Thus, each measurement module 5 to 8 measures at least one parameter of the associated wheel 1 to 4 and communicates with the central unit 11. However, each measurement module 5 to 8 can at least communicate with one or more control and/or remote control devices of the measurement modules 5 to 8 other than the central unit 11, in particular a mobile telephone provided with an application suitable for communicating with the measurement modules 5 to 8.

Within the scope of an aspect of the present invention, the "ABS" wheel anti-lock braking system 13 to 16, 17, or the "ESP" dynamic stability control system, comprise four wheel speed sensors 13 to 16 positioned on the vehicle V, each in the vicinity of a wheel 1 to 4, and adapted to supply, in the form of values that can be converted into angular values, data representing the orientation of said wheel 1 to 4. A module for monitoring/controlling the "ABS" wheel anti-lock braking system 13 to 16 or the "ESP" dynamic stability control system is referenced using reference sign 17.

In the system for monitoring parameters, such as the pressure or the temperature, of the tires and comprising wheel units 5 to 8 as measurement modules, a position of each measurement module 5 to 8 on the vehicle V has been previously identified and stored in the respective measurement modules 5 to 8.

According to the prior art, it is known that each measurement module 5 to 8 equipping the wheel 1 to 4 to be located delivers a plurality of radio frequency signals transmitted at successive times for angular positions of the measurement module 5 to 8 offset by angular values determined in relation to the angular transmission position of the first signal, this occurs toward the central unit 11 of the monitoring system, but also toward another monitoring and/or control device 11. In this case, it involves fixed angle synchronized emissions of a measurement module, with the selected angle being able to assume a plurality of possible values, for example, 0°, 90°, 180°, 270°, yet without this being limiting.

A measurement module 5 to 8 emits at a fixed angle. The diameter of the wheel 1 to 4, the winding nature of the road, can influence the emission.

Each of these signals can particularly comprise the identification code of the measurement module 5 to 8 and data representing the angular emission position. These signals are emitted periodically, with one emission every 15 to 20 seconds over a duration of several minutes, for example, of 40×15 s to 40×20 s, with a view to, on the one hand, comply with the radio frequency standards and, on the other hand, to allow sufficient desynchronization of the wheels 1 to 4.

With reference to all the figures, an aspect of the present invention relates to a method for pairing a measurement module 5 to 8 with a wheel 1 to 4 of a motor vehicle comprising a plurality of wheels 1 to 4, the method being implemented by a computer placed on board the vehicle. The measurement module 5 to 8 is mounted in one of the wheels 1 to 4 and comprises an accelerometer or a shock sensor capable of detecting a radial acceleration allowing an emission angle A of successive measurement signals intended for the computer to be determined.

With more particular reference to FIG. 2 and to FIG. 1, the emission angle A of a measurement signal in a measurement module 5 to 8 is determined as follows.

A physical signal Psign is received by an accelerometer 20 and the radial acceleration acquisitions are consolidated into a sampling module 21 with a number N of acquisitions per wheel revolution 1 to 4. A wheel revolution frequency Fe and a sampling frequency Fs are considered, with, between the two frequencies, the following relation:

$$Fs=Fe\cdot N.$$

Filtering of the wheel revolution frequency Fe is performed in a filtering module 22 acting as filtering means, the purpose of said filtering is to extract a gravitational component of a radial acceleration at a substantially constant period. Subsequently, the emission angle A of the signal emitted by the measurement module 5 to 8 is detected in the detection module 23.

The sampling is performed on a number x of wheel revolutions 1 to 4 in order to have a total number of acquisitions n that is equal to Nx. If there have not been enough rotations of the wheel 1 to 4, which is referenced nox in FIG. 2, the process reverts back to before the sampling module 21 in order to continue the acquisitions.

Figure 2:
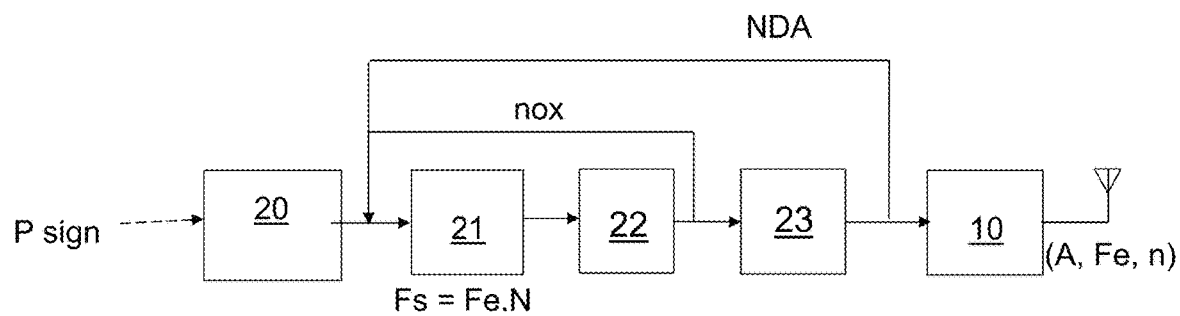
FIG. 2 is a flow diagram of the processing of an acceleration signal in a measurement module according to one embodiment of the method according to the present invention.

If detection has not been possible, which is referenced NDA in FIG. 2, the process reverts back to before the sampling module 21 in order to resume the acquisitions, advantageously by taking a new sample.

If detection has been possible, the transmitter 10 of the measurement module 5 to 8 sends the result of this detection, which is made up of an emission angle A, a wheel revolution frequency Fe and a total number of acquisitions n, to a computer of the central unit, reference sign 11 in FIG. 1, or another monitoring and/or control unit that can be located outside the motor vehicle.

In order to determine the emission angle A, the measurement module 5 to 8 therefore firstly takes a sample of a number of acquisitions of radial accelerations as a function of the time per wheel revolution N, with the sampling being repeated for a consecutive number x of wheel revolutions 1 to 4, in order to provide a total number of acquisitions n. Subsequently, secondly, the measurement module 5 to 8 filters 22 the wheel revolution frequency Fe in order to extract a gravitational component of a radial acceleration on the total number of acquisitions n. Finally, thirdly, the measurement module 5 to 8 computes a current emission angle value A from the extracted gravitational component.

Figure 3:
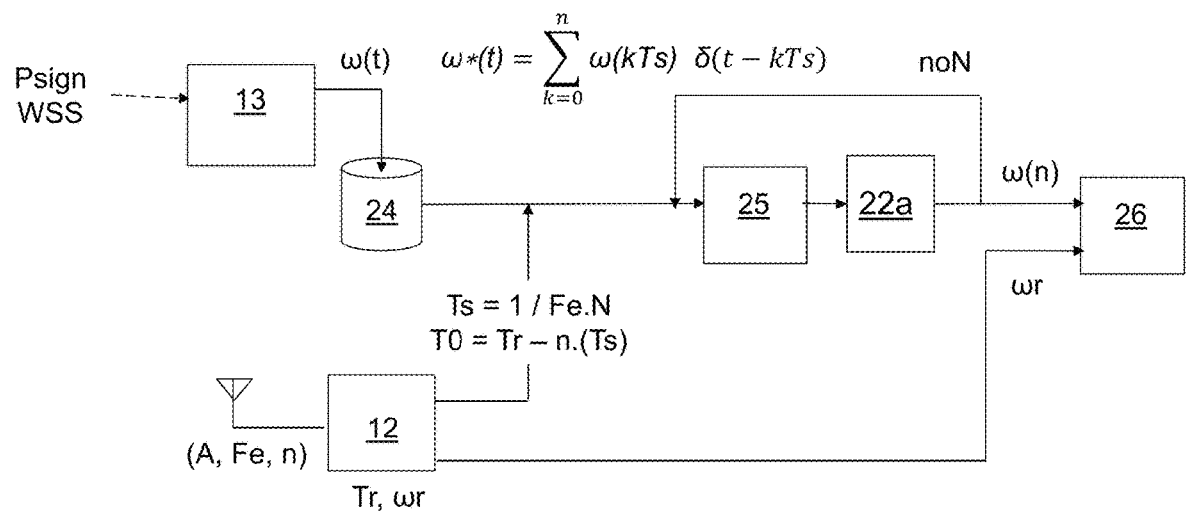
FIG. 3 is a flow diagram of the processing of an angular position signal received by a computer forming part of a control unit for measurement modules according to the embodiment of the method according to the present invention.

With reference to FIGS. 1 and 3, which relate to the computer of the central unit, reference sign 11 in FIG. 1, a physical signal Psign WSS is received by a wheel speed sensor, reference sign 13 in FIG. 3, but which also can have reference sign 14 to 16, of the preceding angular positions ω(t) previously stored in a module 24 for storing radial acceleration acquisitions.

The central unit, reference sign 11 in FIG. 1, also receives the emission angle A, wheel frequency Fe and total number of acquisitions n measurements from the measurement module 5 to 8.

Conventionally, the central unit 11 therefore receives, at the same time and periodically, orientation signals representing an angular position ωr of each wheel 1 to 4 and compares a phase shift between the emission angles A of the measurement signals received from the measurement module 5 to 8 and the respective angular positions ωr for each wheel 1 to 4. The computer of the central unit 11 computes, for each wheel 1 to 4, a pairing of the measurement module 5 to 8 with the wheel 1 to 4, the angular positions ωr of which exhibit a constant phase shift with the emission angles A of a plurality of measurement signals received from the same measurement module.

As previously stated, the wheel revolution frequency Fe value and the total number of acquisitions n are sent to the computer in the measurement signal, in addition to the current emission angle A value, with the computer having stored a reception time Tr and a current angular position ωr for at least one wheel 1 to 4.

The finding underlying an aspect of the present invention is that the values of the computed emission angles A may have been distorted by the filtering 22 performed in the measurement module 5 to 8.

The computer of the central unit 11 has also previously stored a series of angular positions ω(t) for said at least one wheel 1 to 4 in the storage module 24. The computer of the central unit 11 selects, in a selection module 25 and from the series of stored angular positions ω(t), the angular positions ω*(t) sampled at the same period Ts equal to the inverse of the wheel revolution frequency Fe multiplied by the number of acquisitions of radial accelerations as a function of the time per wheel revolution N.

The wheel revolution frequency Fe value, which is a component of the sampled angular positions ω*(t), is filtered 22a, which filtering is similar to the filtering 22 performed in the measurement module 5 to 8, in order to obtain a curve of sampled and filtered angular positions, from which a sampled and filtered angular position ω(n) is derived that is obtained after n samples are taken or from which a specific sampled and filtered angular position is derived for n samples representing a total sampling number per wheel revolution that multiplies the number of wheel revolutions.

The specific sampled and filtered angular position ω(n) for a total number of samples n is then compared with the current angular position ωr in a comparison module 26. When the sampled and filtered angular position ω(n) associated with said at least one wheel 1 to 4 only differs by less than an experimentally predetermined percentage of the current angular position ωr, the comparison of a phase shift between the emission angles A of the measurement signals received from the measurement module 5 to 8 and the respective angular positions ωr for said at least one wheel 1 to 4 is validated.

It is then estimated that the emission angle A thus filtered in the measurement module 5 to 8 has not been distorted by this filtering, given that a comparison has provided the sampled and filtered angular position ω(n) that is substantially equal to the current angular position ωr.

The aforementioned percentage, which is experimentally determined using routine tests, can be equal to approximately 1%, which is by no means limiting.

The computer of the central unit 11 can select, in the selection module 25 and from the stored angular positions ω(t), the angular positions ω*(t) sampled at the same period Ts with a current number of acquisitions k. The selection continues with an increase in the number of current acquisitions until the number of current acquisitions k reaches the total number of acquisitions n.

Indeed, if there have not been enough acquisitions of angular positions ω*(t), which is referenced noN in FIG. 3, the process reverts back to before the selection module 25 in order to continue the acquisitions for sampling.

This method can be implemented for each wheel 1 to 4 or specifically for the wheel 1 to 4 already paired with said measurement module 5 to 8, with the control unit and its computer having previously detected, for this wheel 1 to 4 and this measurement module 5 to 8, angular positions ωr exhibiting a constant phase shift with the emission angles of a plurality of measurement signals received from the same measurement module from the measurement modules 5 to 8.

The wheel revolution frequency Fe is computed using the following equation:

$$Fe = \frac{1}{2\pi} \times \sqrt{\frac{Z}{R}}$$

with Z being the radial acceleration and R being the radius of the wheel 1 to 4.

Figure 4A:
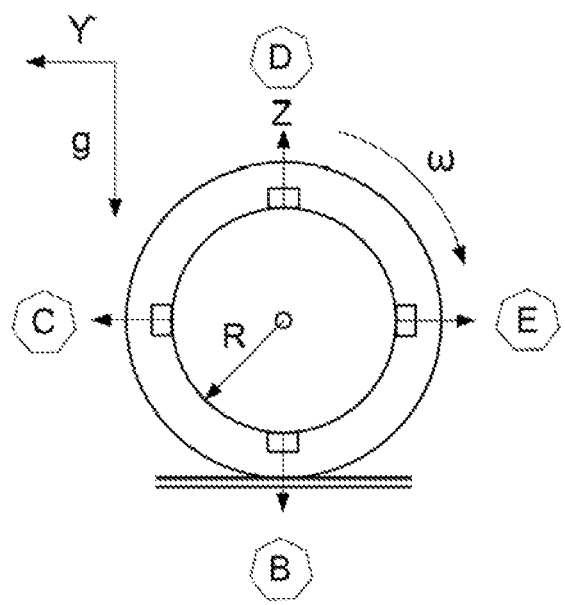
FIG. 4A shows a wheel of a motor vehicle equipped with a measurement module rotating with the wheel and FIG. 4B shows the angle of emission curve of a signal of the measurement module obtained during the rotation of the wheel, with a method according to an aspect of the invention being able to be implemented for such a wheel of a motor vehicle.
Figure 4B:
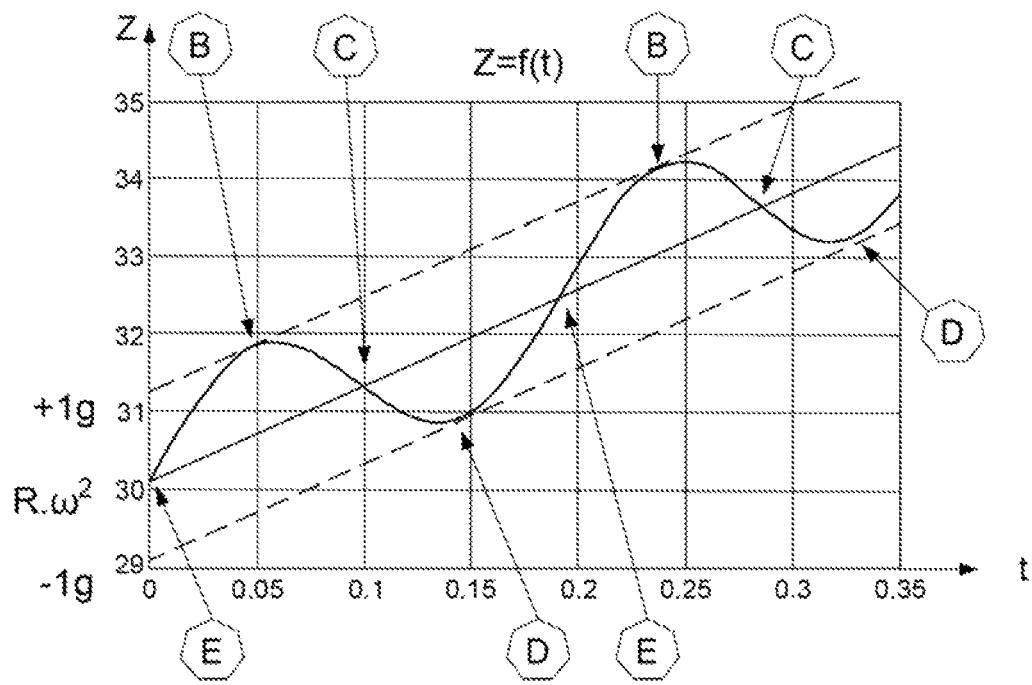

With reference to FIGS. 4A and 4B and to FIG. 1, the radial acceleration Z can be obtained as per the following equation:

$$Z = R \cdot \omega^2 + g \cdot \sin(\omega \cdot (t-t_0)+\varphi) + \gamma \cdot \cos(\omega \cdot (t-t_0)+\varphi),$$

with g being the gravity, t being the time, ω being the rotation speed of the wheel 1 to 4, t0 being the initial time, γ being a tangential acceleration component and φ being a phase shift, the product $R \cdot \omega^2$ being the centrifugal component, $g \cdot \sin(\omega \cdot (t-t_0)+\omega)$ being the gravitational component, $\gamma \cdot \cos(\omega \cdot (t-t_0)+\varphi)$ being the longitudinal acceleration component, the gravitational component being extracted from the signal when filtering 22 the wheel revolution frequency Fe.

FIG. 4A shows a wheel of a motor vehicle with a radius R, with a measurement module placed in various positions B to E when the wheel rotates with an angular speed ω. Reference sign g represents gravity, γ represents a tangential component of the acceleration and Z represents the radial component of the acceleration.

FIG. 4B shows the acceleration curve Z as a function of a substantially sinusoidal time t obtained during successive rotations of the wheel of the motor vehicle with an indication on the curve of the positions B to E shown in FIG. 4A. A centrifugal component $R\omega^2$ needs to be filtered on this curve in order to obtain a sinusoid representing an extraction of a gravitational component of a radial acceleration. This is performed by the filtering module 22 in the measurement module. The static or centrifugal component $R \cdot \omega^2$ of the radial acceleration Z is corrected or eliminated. Therefore, the resulting gravitational and longitudinal signal is re-centred on 0.

With further reference to FIG. 3, the computation of an angular position ω*(t) sampled at a time t is performed according to a periodic Dirac comb distribution with a period Ts. Each tooth of the comb or Dirac has an infinite value at 0 and a value of zero everywhere else. If t−kTs=0, then the Dirac δ(t−kTs)=1; but if t−kTs differs from 0, then the Dirac δ(t−kTs)=0. So, if a function is multiplied by a Dirac of period Ts, only the points of the function are gathered as output where t is a multiple of Ts, which is the actual case with a sampler.

The sampled angular position ω*(t) is provided as per the following equation, with the period Ts being equal to 1/Fe·N, with ω(kTs) being the angular position on the number of acquisitions k, δ being the symbol of the Dirac, with this being as per the following equation:

$$\omega^*(t) = \sum_{k=0}^{n} \omega(kTs)\, \delta(t - kTs)$$

With a Dirac comb, a sample ω(t) is retained when (t−kTs)=0, that is for all the values t with a periodicity Ts (1×Ts, 2×Ts, 3×Ts . . . n×Ts).

A series of vertical lines of different heights is thus obtained, the respective peaks of which define a profile of a curve, in this case a sine curve.

When the current number of acquisitions k does not reach the total number of acquisitions n, the computation of the sampled angular position ω*(t) is continued on a larger number of current acquisitions until the total number of acquisitions n is reached.

At the start of the sampling period, that is T0, the current number of acquisitions k equals 0 and the current sampling time is the start time, that is t equals 0.

At the end of the sampling period, that is Tn, with n being the total number of acquisitions, and n being equal to the number of acquisitions N during a revolution of a wheel 1 to 4 repeating x times, the number of acquisitions k is equal to n and the current sampling time is the final time, that is t=n. Ts with Ts=1/Fe·N, with Fe being the rotation frequency of the wheel 1 to 4, Ts being the period of a sampling operation.

A relationship exists between, on the one hand, the start of the sampling period T0 and, on the other hand, as a function of the reception time Tr of the signal sent by the measurement module, the total number of acquisitions n and the sampling period Ts as per the following equation:

$$T0=Tr-nTS.$$

With reference to all the figures, an aspect of the invention relates to an assembly of a computer, advantageously integrated in a central unit 11 placed on board the motor vehicle, but which can be associated with a mobile telephone, a tablet or a computer and measurement modules respectively associated with a wheel 1 to 4 of a motor vehicle for implementing the method as previously described.

Each measurement module 5 to 8 has means 10 for emitting and receiving measurement signals received or emitted by the computer, with the computer having, on the one hand, means 12 for emitting and receiving signals received or emitted by each measurement module 5 to 8 and, on the other hand, means for receiving orientation signals representing the angular orientation of each wheel 1 to 4, with each measurement module 5 to 8 having means 22 for filtering the wheel revolution frequency Fe.

According to an aspect of the invention, the computer comprises means for storing a reception time Tr of a signal, originating from one measurement module 5 to 8 or from each measurement module 5 to 8, of a current angular position ωr provided by a system for measuring the angular position of each wheel 1 to 4, such as a wheel "ABS" anti-locking system 13 to 16, 17 or an "ESP" dynamic stability control system.

The computer can thus store, in its memory or storage means 24, a series of prior angular positions for at least one wheel 1 to 4. The computer comprises means for selecting angular positions ω*(t) sampled at the same period Ts in the series of angular positions ω(t).

The computer comprises filtering means 22a, similar to the filtering means of the filtering module 22 of the measurement module 5 to 8, for filtering the wheel revolution frequency Fe component in the sampled angular positions ω*(t) in order to obtain a sampled and filtered angular position ω(n) obtained for the total number of acquisitions n.

Filtering 22a the wheel revolution frequency Fe component in the sampled angular positions ω*(t) allows a sampled and filtered angular position ω(n) to be obtained for the total number of acquisitions n.

The computer comprises means for comparing the current angular position ωr with the sampled and filtered angular position ω(n) in order to validate the comparison of a phase shift between measurement signals received from the measurement module 5 to 8 and respective angular positions ωr for said at least one wheel 1 to 4.

An aspect of the invention relates to a motor vehicle comprising a computer, a plurality of wheels 1 to 4, each wheel 1 to 4 comprising a measurement module 5 to 8, and a plurality of wheel anti-lock braking modules 13 to 16, with each anti-lock braking module 13 to 16 mounted facing a wheel 1 to 4 comprising means for emitting orientation signals ωr to the computer that represent the angular orientation of said wheel 1 to 4, the computer and the measurement modules forming an assembly as previously described.

The invention claimed is:

1. A method for pairing a measurement module with a wheel of a motor vehicle comprising a plurality of wheels, the method being implemented by a computer, the measurement module being mounted in one of the wheels and comprising an accelerometer or a shock sensor allowing an emission angle to be determined of successive measurement signals intended for the computer, which at the same time and periodically receives orientation signals representing an angular position (ωr) of the wheel and which compares a phase shift between the emission angles of the measurement signals received from the measurement module and the respective angular positions (ωr) for the wheel, the computer, for the wheel, pairing the measurement module with the wheel for which the angular positions (ωr) exhibit a constant phase shift with the emission angles of a plurality of measurement signals received from the same measurement module, the measurement module, in order to determine the emission angle, performing the following:

firstly, sampling a number of acquisitions of radial accelerations as a function of the time per wheel revolution, the sampling being repeated for a number x of consecutive wheel revolutions in order to provide a total number of acquisitions;

secondly, filtering the wheel revolution frequency in order to extract a gravitational component of a radial acceleration on the total number of acquisitions; and thirdly, computing a current emission angle value from the extracted gravitational component, wherein the wheel revolution frequency value and the total number of acquisitions are sent to the computer in the measurement signal, in addition to the current emission angle value, with the computer having stored a reception time and a current angular position (ωr) for at least one wheel by having also previously stored a series of angular positions (ω(t)) for said at least one wheel and the computer selects, from the series of stored angular positions (ω(t)), the angular positions (ω*(t)) sampled at a same period equal to an inverse of the wheel revolution frequency multiplied by the number of acquisitions of radial accelerations as a function of the time per wheel revolution, the selected angular positions (ω*(t)) being filtered by a filter, a cut-off frequency of which is the rotation frequency of the wheel, similar to the filtering performed in the measurement module, and being implemented in order to obtain a curve of sampled and filtered angular positions, from which a sampled and filtered angular position (ω(n)) is derived that is obtained after n samples, then compared with the current angular position (ωr), and, when the sampled and filtered angular position (ω(n)) associated with said at least one wheel only differs by less than an experimentally predetermined percentage of the current angular position (ωr), the comparison of a phase shift between the emission angles of the measurement signals received from the measurement module and the respective angular positions (ωr) for said at least one wheel is validated.

2. The method as claimed in claim 1, wherein the method is implemented for each wheel.

3. The method as claimed in claim 1, wherein the method is implemented for the wheel previously paired with said measurement module, for which wheel the angular positions (ωr) exhibit a constant phase shift with the emission angles of a plurality of measurement signals received from said measurement module.

4. The method as claimed in claim 1, wherein the wheel revolution frequency is computed using the following equation:

$$Fe = \frac{1}{2\pi} \times \sqrt{\frac{Z}{R}}$$

with Z being the radial acceleration and R being the radius of the wheel.

5. The method as claimed in claim 1, wherein the radial acceleration Z is obtained as per the following equation:

$$Z = R \cdot \omega^2 + g \cdot \sin(\omega \cdot (t-t_0) + \varphi) + \gamma \cdot \cos(\omega \cdot (t-t_0) + \varphi),$$

with g being the gravity, t being the time, ω being the rotation speed of the wheel, t0 being the initial time, γ being a tangential acceleration component and φ being a phase shift, the product $R \cdot \omega^2$ being the centrifugal component, $g \cdot \sin(\omega \cdot (t-t_0)+\varphi)$ being the gravitational component, $\gamma \cdot \cos(\omega \cdot (t-t_0)+\varphi)$ being the longitudinal acceleration component, the gravitational component being extracted from the signal when filtering the wheel revolution frequency.

6. The method as claimed in claim 1, wherein the computer selects, from the series of stored angular positions (ω(t)), the angular positions sampled at the same period Ts with a current number of acquisitions k and continues the selection until the number of current acquisitions k reaches the total number of acquisitions.

7. The method as claimed in claim 6, wherein the computation of the curve of an angular position (ω*(t)) sampled at a time t is performed as per a Dirac comb with teeth sampled over a period Ts, each tooth equaling the entire current mass of the sampled angular position (ω*(t)), the period Ts being equal to 1/Fe·N, with Fe being the wheel revolution frequency and N being the number of acquisitions per wheel revolution, ω(kTs) being the angular position at the current number of acquisitions k, δ being the representation of a Dirac, as per the following equation:

$$\omega^*(t) = \sum_{k=0}^{n} \omega(kTs)\, \delta(t-kTs).$$

8. The method as claimed in claim 1, wherein, when the number of current acquisitions k does not reach the total number of acquisitions, the computation of the sampled and filtered angular position (ω*(t)) is continued on a larger number of current acquisitions until the total number of acquisitions is reached.

9. An assembly of a computer and of measurement modules respectively associated with a wheel of a motor vehicle for implementing a method as claimed in claim 1, each measurement module having means for emitting and receiving measurement signals received or emitted by the computer, the computer having, on the one hand, means for receiving signals emitted by each measurement module and, on the other hand, means for receiving orientation signals representing the angular orientation of each wheel, each measurement module having a first filter for filtering the wheel revolution frequency in order to extract a gravitational component of a radial acceleration on the total number of acquisitions, the computer comprising:
 a memory storing a reception time (Tr), a current angular position (ωr) and a series of angular positions (ω(t)) for at least one wheel,
 the computer being adapted to select angular positions (ω*(t)) sampled at the same period in the series of angular positions (ω(t)),
 a second filter, similar to the first filter of the measurement module, for filtering the wheel revolution frequency component in the sampled angular positions (ω*(t)) in order to obtain a sampled and filtered angular position (ω(n)),
 wherein the computer is adapted to compare the current angular position (ωr) with the sampled and filtered angular position (ω(n)) in order to validate the comparison of a phase shift between measurement signals received from the measurement module and respective angular positions (ωr) for said at least one wheel.

10. A motor vehicle comprising a computer, a plurality of wheels, each wheel comprising a measurement module, and, a plurality of wheel anti-lock braking modules, with each anti-lock braking module being mounted facing a wheel comprising means for emitting orientation signals (ωr) to the computer that represent the angular orientation of said wheel, wherein the computer and the measurement modules form an assembly according to claim 9.

* * * * *